United States Patent
Kashyap et al.

(10) Patent No.: US 10,686,769 B2
(45) Date of Patent: Jun. 16, 2020

(54) SECURE KEY CACHING CLIENT

(71) Applicant: Fortanix, Inc., Mountain View, CA (US)

(72) Inventors: Anand Kashyap, Los Altos, CA (US); Andrew Leiserson, San Francisco, CA (US); Jeffrey Seyfried, Cupertino, CA (US); Jethro Gideon Beekman, San Francisco, CA (US)

(73) Assignee: FORTANIX, INC., Mountain View, CA (US)

( * ) Notice: Subject to any disclaimer, the term of this patent is extended or adjusted under 35 U.S.C. 154(b) by 120 days.

(21) Appl. No.: 15/670,957

(22) Filed: Aug. 7, 2017

(65) Prior Publication Data

US 2019/0044929 A1    Feb. 7, 2019

(51) Int. Cl.
| | | |
|---|---|---|
| *H04L 9/08* | (2006.01) | |
| *H04L 29/06* | (2006.01) | |
| *H04W 12/04* | (2009.01) | |
| *H04W 12/06* | (2009.01) | |
| *H04L 9/32* | (2006.01) | |

(52) U.S. Cl.
CPC ............ *H04L 63/062* (2013.01); *H04L 9/088* (2013.01); *H04L 9/0897* (2013.01); *H04L 9/3231* (2013.01); *H04L 9/3247* (2013.01); *H04L 63/0823* (2013.01); *H04W 12/04* (2013.01); *H04W 12/06* (2013.01)

(58) Field of Classification Search
CPC . H04L 63/062; H04L 9/3247; H04L 63/0823; H04W 12/06; H04W 12/04
USPC .......................................................... 380/278
See application file for complete search history.

(56) References Cited

U.S. PATENT DOCUMENTS

| | | | |
|---|---|---|---|
| 8,856,531 B1* | 10/2014 | Robinson | H04L 9/0841 380/28 |
| 2011/0184913 A1* | 7/2011 | Hayden | G06F 11/2097 707/652 |
| 2013/0290723 A1* | 10/2013 | Yu | H04W 4/70 713/171 |

* cited by examiner

*Primary Examiner* — Mohammad W Reza
(74) *Attorney, Agent, or Firm* — Lowenstein Sandler LLP

(57) ABSTRACT

A first connection between a first network server and a second network server may be established where the first connection is based on a connection key stored at a secure location of the first network server. A request for one or more cryptographic keys may be transmitted from the first network server to the second network server. The first network server may receive the one or more cryptographic keys from the second network server over the first connection. The one or more cryptographic keys from the second server may be stored at the secure location of the first network server that is storing the connection key used to establish the first connection.

20 Claims, 6 Drawing Sheets

SECURE KEY CACHING CLIENT

TECHNICAL FIELD

Aspects of the present disclosure relate generally to cryptographic keys, and more specifically, relate to a secure key caching client.

BACKGROUND

An application may utilize a cryptographic operation to be performed with data. For example, the data may be encrypted data that is to be decrypted or the data may be signed by a digital signature that is to be verified. In general, the cryptographic operation may utilize a cryptographic key. For example, a private key may be used to decrypt data that has been encrypted (e.g., ciphertext) or to provide a digital signature for authenticating the identity of a sender of a digital message. The application may store the private key to be used for a performance of a subsequent cryptographic operation.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
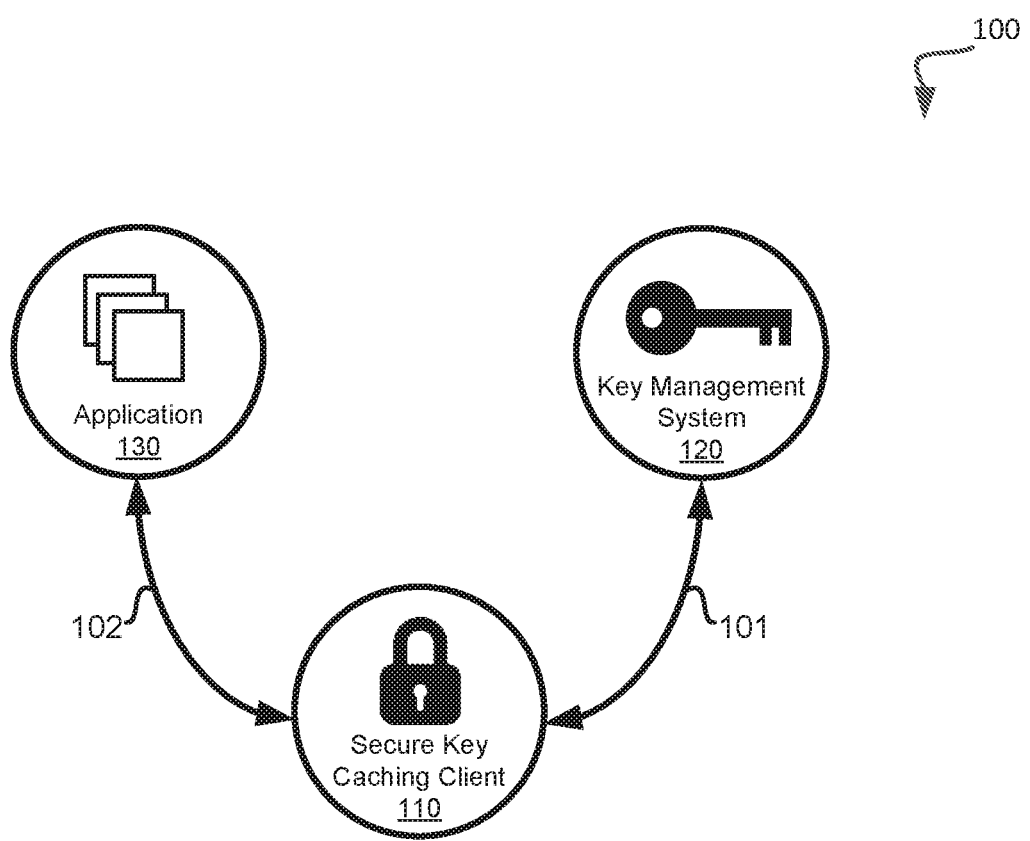
FIG. 1 illustrates an example environment to provide a secure key caching client in accordance with some embodiments.

Aspects of the present disclosure relate to a secure key caching client. In general, an application may utilize a cryptographic key to perform a cryptographic operation. Such operations may include, but are not limited to, encrypting data, decrypting data, generating a cryptographic signature, verifying a cryptographic signature, etc. The application may operate on a network server and may request and receive the cryptographic key from a key management system at another network server. Such a key management system may be any system that stores multiple cryptographic keys for various applications. The key management system may transmit a requested cryptographic key over a network to the network server providing the application. Subsequently, the application may perform the cryptographic operation by utilizing the received cryptographic key.

The performing of the cryptographic operation with the cryptographic key by the application on the network server may expose the cryptographic key to security vulnerabilities. For example, the cryptographic key may be insecurely stored at the network server so that an unauthorized entity (e.g., a malware application) may retrieve the cryptographic key stored at the network server and may subsequently perform cryptographic operations with the cryptographic key. As a result, the cryptographic key for use by the application may be exposed to an unauthorized entity to perform the cryptographic operations used by the application.

Alternatively, the key management system may perform the cryptographic operations requested by the application. For example, instead of transmitting the cryptographic key to the network server providing the application, the application may transmit data to the key management system so that the key management system may use the cryptographic key that it is storing with the data received from the application to generate an output. Subsequently, the output may be returned to the application. However, since the key management system may store cryptographic keys for multiple applications, the amount of time to perform the cryptographic operation may be increased as the key management system may be performing other cryptographic operations for other applications.

Aspects of the present disclosure address the above and other deficiencies by providing a secure key caching client for use by an application. The secure key caching client may be on a network server that is separate from the key management system. For example, the secure key caching client may be provided by a network server that is also providing an application that uses cryptographic keys stored at the secure key caching client or may be provided by another network server of a data center that includes other network servers that provide applications utilizing the cryptographic keys stored at the secure key caching client. The use of the secure key caching client may extend a security boundary from the key management system to the secure key caching client. For example, the security boundary may extend from a first network server (e.g., the key management system) to a secure portion or location of a second network server (e.g., the secure key caching client).

The security boundary including the key management system and the secure key caching client may be based on a cryptographic key that is used to establish a secure network connection between the key management system and the secure key caching client. An example of the secure network connection includes, but is not limited to, Transport Layer Security (TLS). In general, TLS may use a cryptographic key (i.e., a connection key) to establish a secure network connection between two network servers. For example, a symmetric key may be established to encrypt and/or decrypt data transmitted over the secure network connection. Such a key may be stored at the secure key caching client and a corresponding copy may be stored at the key management system. Thus, the secure network connection may be established between the key management system and the secure key caching client where the secure key caching client stores the connection key used in the secure network connection. As described in further detail below, the secure key caching client may be a secure location that is based on a secure enclave, kernel cryptosystem, white box cryptosystem, or any other secure cryptographic system. Since the cryptographic key used to facilitate the secure network connection between the key management system and the network server that provides the secure key caching client is stored at the secure location of the secure key caching client, the secure network connection may be considered to terminate at the secure key caching client as the connection key is not transmitted from the secure key caching client.

After the secure network connection has been established, one or more cryptographic keys may be provided to the secure key caching client from the key management system over the secure network connection. The received cryptographic keys may be stored at the same secure location as the connection key. An application may thus provide a request for a cryptographic operation to be performed by the secure key caching client by using a cryptographic key at the secure location. The secure key caching client may then perform the cryptographic operation by using the cryptographic key and may provide the result to the application. As such, since the cryptographic keys are stored at the same secure location as the connection key and are not transmitted from the secure key caching client, the cryptographic keys may be considered to be secure from an unauthorized entity as the unauthorized entity may not be able to retrieve the cryptographic keys as the connection key is not known to the unauthorized entity.

Advantages of the present disclosure include, but are not limited to, a secure storage of cryptographic keys at a network server that is separate from the key management system. For example, the network server that includes the secure key caching client may be local to an application (e.g., the same network server may provide both the secure key caching client and the application or the network server may be in the same data center as the network server providing the secure key caching client). Thus, the cryptographic operations may be performed faster and more efficiently as a single key management system is not performing cryptographic operations for many applications across many different network servers and/or data centers. Furthermore, the security of the cryptographic keys may be maintained by the storing of the cryptographic keys at the same secure location as the connection key.

FIG. 1 illustrates an example environment 100 to provide a secure key caching client. The environment 100 may correspond to network servers that provide an interaction between an application and the secure key caching client as well as between the secure key caching client and a key management system.

As shown in FIG. 1, the environment 100 may correspond to a network cluster or a data center. For example, a first network server may provide the secure key caching client 110, a second network server may provide an application 130, and a third network server may provide a key management system 120. In some embodiments, a same network server may provide both the application 130 and the secure key caching client 110. The third network server that is providing the key management system 120 may be external from a data center that includes network servers that provide the application 130 and the secure key caching client 110.

As shown in FIG. 1, a network connection 101 may couple the secure key caching client 110 with the key management system 130. The network connection 101 may be a secure connection provided over a network. Examples of the network connection 101 include, but are not limited to, TLS, Key Management Interoperability Protocol (KMIP) over TLS, Representational State Transfer (REST) application programming interface (API) over TLS, etc. As previously described, the network connection 101 may be based on a connection key that is stored at a secure location corresponding to the secure key caching client 110. Examples of such a secure location include, but are not limited to, a secure enclave, a kernel cryptosystem, a white box cryptosystem, etc. Further details with regards to a secure enclave are described in conjunction with FIG. 5. The kernel cryptosystem may be a process associated with the kernel space (e.g., a memory area that is reserved for privileged operations of an operating system kernel). Thus, the connection key may be effectively stored at a secure location.

The key management system 130 may be a hardware security module (HSM), a key management service (KMS), or any other software or hardware resource that stores cryptographic keys. Thus, the key management system 130 may store and manage cryptographic keys for use by different applications provided by different network servers. The cryptographic keys from the key management system 130 may be transmitted to the secure key caching client 110 and subsequently stored at the secure location corresponding to the secure key caching client 110. Since the connection key used to facilitate the network connection 101 is in a secure location and the cryptographic keys received from the key management system 130 are stored at the same secure location (e.g., a region of the memory that is secure), a security boundary may be considered to include both the key management system 130 and the secure key caching client 110 that is provided by another network server.

The application 130 may interact with the secure key caching client 110 over a second connection 102. In some embodiments, the second connection 102 may be another network connection between a network server that provides the application 130 and another network server that provides the secure key caching client 110. In the same or alternative embodiments, the second connection 102 may be a local connection associated with a network server that provides both the application 130 and the secure key caching client 110. The second connection 102 may be a less secure connection than the network connection 101. Furthermore, the second connection 102 may not be based on a connection key that is stored at the secure key caching client 110. The second connection 102 may be based on, but is not limited to, Public-Key Cryptography Standards (PKCS) #11, Java Cryptography Extension (JCE), REST API, KMIP, etc.

In operation, the secure key caching client 110 may receive a request from the application 130 to perform a cryptographic operation. In response to receiving the request, the secure key caching client 110 may establish the network connection 101 with the key management system 120. Subsequently, the secure key caching client 110 may request at least one cryptographic key from the key management system 120. The requested cryptographic key may be transmitted from the key management system 120 to the secure key caching client 110 and stored at the secure key caching client 110 that also stores the connection key used to facilitate the network connection 101. The key caching client 110 may subsequently perform the cryptographic operation with the cryptographic key (and any other data received from the application) and may provide an output of the cryptographic operation to the application 130 over the second connection 102. Further details with regards to the secure key caching client 110 are described in conjunction with FIGS. 3-5.

Figure 2:
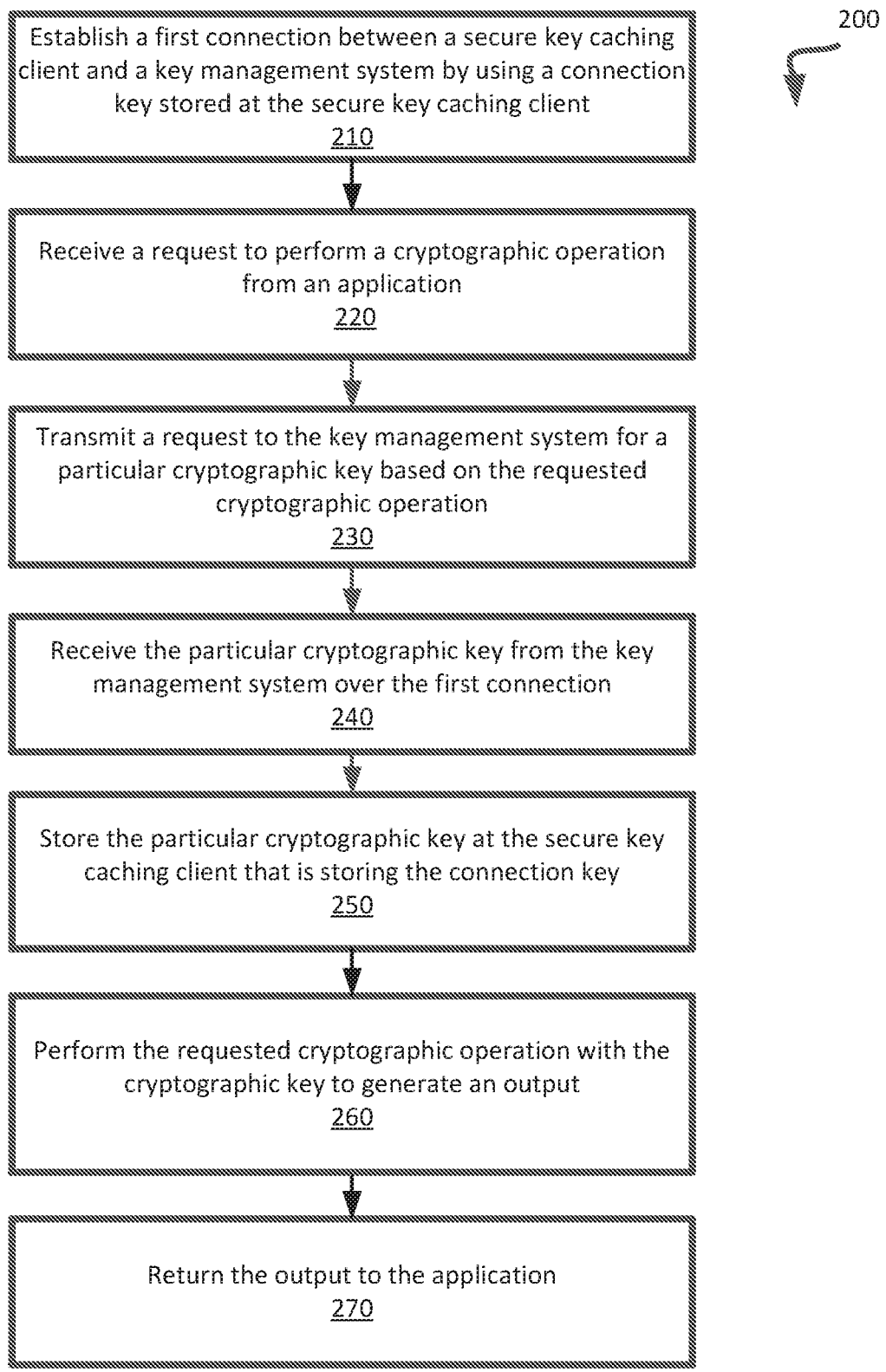
FIG. 2 illustrates a flow diagram of an example method to retrieve and store a key at a secure key caching client in accordance with some embodiments of the present disclosure.

FIG. 2 illustrates a flow diagram of an example method 200 to retrieve and store a key at a secure key caching client. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the secure key caching client 110 of FIG. 1.

As shown in FIG. 2, the method 200 may begin with the processing logic establishing a first connection between a secure key caching client and a key management system by using a connection key stored at the secure key caching client (block 210). For example, a first network server that provides the secure key caching client may establish a secure network connection with a second network server corresponding to the key management system. The secure network connection may be established by using the connection key that is stored at a secure location of the first network server. In some embodiments, the secure location may correspond to the secure key caching client that is associated with a secure enclave, a kernel cryptosystem, or a white box cryptosystem as described in further detail with regards to FIG. 5. The secure location may also store the connection key that is used to facilitate the secure network connection between the first and second servers. Thus, the secure network connection may be considered to terminate within the secure location as the connection is used to facilitate the secure network connection from the secure location and is not transmitted from the secure location. In alternative embodiments, the secure network connection may be based on key wrapping.

In some embodiments, the first connection between the secure key caching client and the key management system may be based on an attestation process. For example, the secure key caching client may generate a digital certificate that includes a signature that is based on the connection key of the first connection that is stored at the secure key caching client. Subsequently, the secure key caching client may transmit the digital certificate to the key management system. In some embodiments, the digital certificate may include or be transmitted with an attestation data that is based on an identification of a processor of a network server that is providing the secure key caching client. After receiving the digital certificate with the attestation data, the key management system may verify the attestation data to determine whether the secure key caching client is valid. If so, then the key management system may enroll the digital certificate and use a corresponding cryptographic key for the first connection. In alternative embodiments, a certificate authority may provide the digital certificate to the secure key caching client after verifying the attestation data that is provided by the secure key caching client. Subsequently, the secure key caching client may transmit the digital certificate to the key management system. In alternative embodiments, the attestation data may be generated based on a trusted platform module (TPM).

Referring to FIG. 2, the processing logic may receive a request to perform a cryptographic operation from an application (block 220). For example, the secure key caching client may receive a request from the application over a second connection. The request may correspond to a performance of the cryptographic operation by using a particular cryptographic key. In some embodiments, the request may include application data to be used in the cryptographic operation with the particular cryptographic key. The processing logic may subsequently transmit a request to the key management system for the particular key based on the cryptographic operation that is requested to be performed (block 230). For example, request may be transmitted over the first network connection between the secure key caching client and the key management system. In some embodiments, the key management system may store multiple cryptographic keys and the transmitted request may identify a single cryptographic key or a group of cryptographic keys that are stored at the key management system. Further details with regards to retrieving cryptographic keys from the key management system are described in conjunction with FIG. 3.

The processing logic may further receive the particular cryptographic key from the key management system (block 240). For example, the cryptographic key to be used in the requested cryptographic operation may be received over the first network connection that is based on or uses the connection key stored at the secure location (e.g., the secure key caching client). Furthermore, the processing logic may store the particular cryptographic key at the same secure location that is storing the connection key (block 250). For example, the secure location may correspond to a private region of memory that is not accessible by other processes running at higher privilege levels (e.g., an operating system). Thus, the secure location may correspond to a portion of memory, a kernel, etc. that is more secure than other portions of memory, the kernel, etc. that are accessible to other higher privilege levels. The secure location may store cryptographic keys that are not capable of being transmitted from the secure location without the secure network connection. The processing logic may subsequently perform the requested cryptographic operation with the particular cryptographic key to generate an output (block 260). For example, the cryptographic operation may be performed within the secure key caching client so that the cryptographic key is not transmitted externally from the secure key caching client. The processing logic may further return the output to the application (block 270). For example, the output of the cryptographic operation that uses the particular key may be transmitted to the application over the second connection.

As such, a secure key caching client may store a connection key that is used to establish a secure network connection with another network server that provides a key management system. Furthermore, the key management system may store multiple cryptographic keys that are assigned to multiple applications. At least one of the cryptographic keys stored at the key management system may be transmitted to the secure key caching client over the secure network connection. The received cryptographic key may be stored with the connection key so that the received cryptographic key may be associated with the same security as the connection key.

In some embodiments, the secure key caching client may make a determination as to whether the particular cryptographic key is currently stored at the secure key caching client. If so, then the cryptographic operation may be performed with the particular cryptographic key that is currently stored at the secure key caching client as opposed to requesting the particular cryptographic key from the key management system.

Figure 3:
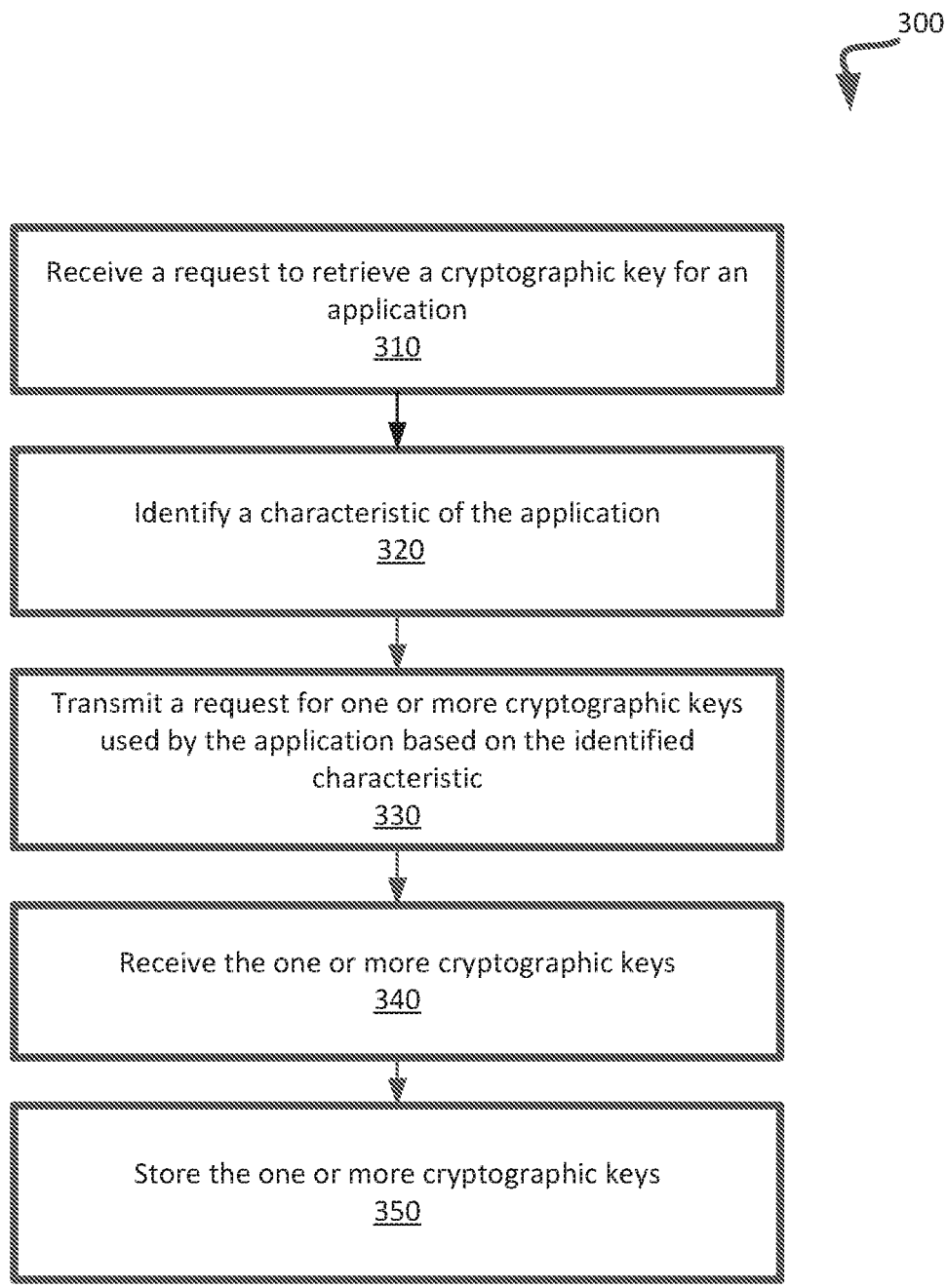
FIG. 3 illustrates a flow diagram of an example method to retrieve cryptographic keys for storage at the secure key caching client based on an application in accordance with some embodiments.

FIG. 3 illustrates a flow diagram of an example method 300 to retrieve cryptographic keys for storage at the secure key caching client based on an application. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the secure key caching client 110 of FIG. 1.

As shown in FIG. 3, the method 300 may begin with the processing logic receiving a request to retrieve a cryptographic key for an application (block 310). For example, the application may provide a request to a secure key caching client for the performing of a cryptographic operation and may identify the cryptographic key that is to be used with the cryptographic operation. The processing logic may further identify a characteristic of the application (block 320) and may transmit a request for one or more cryptographic keys used by the application based on the identified characteristic of the application (block 330). For example, the secure key caching client may identify other cryptographic keys that are assigned to or have been used by the application (e.g., other cryptographic keys used in other cryptographic operations requested by the application) and may transmit a request for any cryptographic key stored at a key management system that is assigned to or used by the application. In some embodiments, the characteristic of the application may correspond to cryptographic keys assigned to or used by the application that are not currently stored at the secure key caching client. For example, if a network server providing the secure key caching client stored a copy of a cryptographic key at a first time, but the network server is later subjected to an error that results in the network server losing the storage of its stored cryptographic keys, then the secure key caching client may identify that it is no longer storing other cryptographic keys of the application and may thus transmit a request for any cryptographic keys associated with the application at the key management system that the secure key caching client is not currently storing. In the same or alternative embodiments, the characteristic may correspond to a frequency of use of a cryptographic key and/or when a cryptographic key was last used. For example, if a particular cryptographic key is not currently stored at the secure key caching client, but is identified as having been frequently used in cryptographic operations for the application or has been recently used in a cryptographic operation for the application, then the secure key caching client may transmit a request for the particular cryptographic key from the key management system.

In some embodiments, the secure key caching client may retrieve a cryptographic key from the key management system when the application requests the performance of a cryptographic operation that uses the cryptographic key and when the secure key caching client system is not currently storing the cryptographic key. In such an instance, the secure key caching client may only request a single cryptographic key to be transmitted from the key management system. Thus, the secure key caching client may establish a first type of connection with the key management system where the secure key caching client requests multiple cryptographic keys from the key management system or the secure key caching client may establish a second type of connection with the key management system where the secure key caching client requests a single cryptographic key from the key management system.

Referring to FIG. 3, the processing logic may further receive the one or more cryptographic keys (block 340) and may store the received one or more cryptographic keys (block 350). For example, the received cryptographic keys may be stored at the secure location corresponding to the secure key caching client as previously described.

Figure 4:
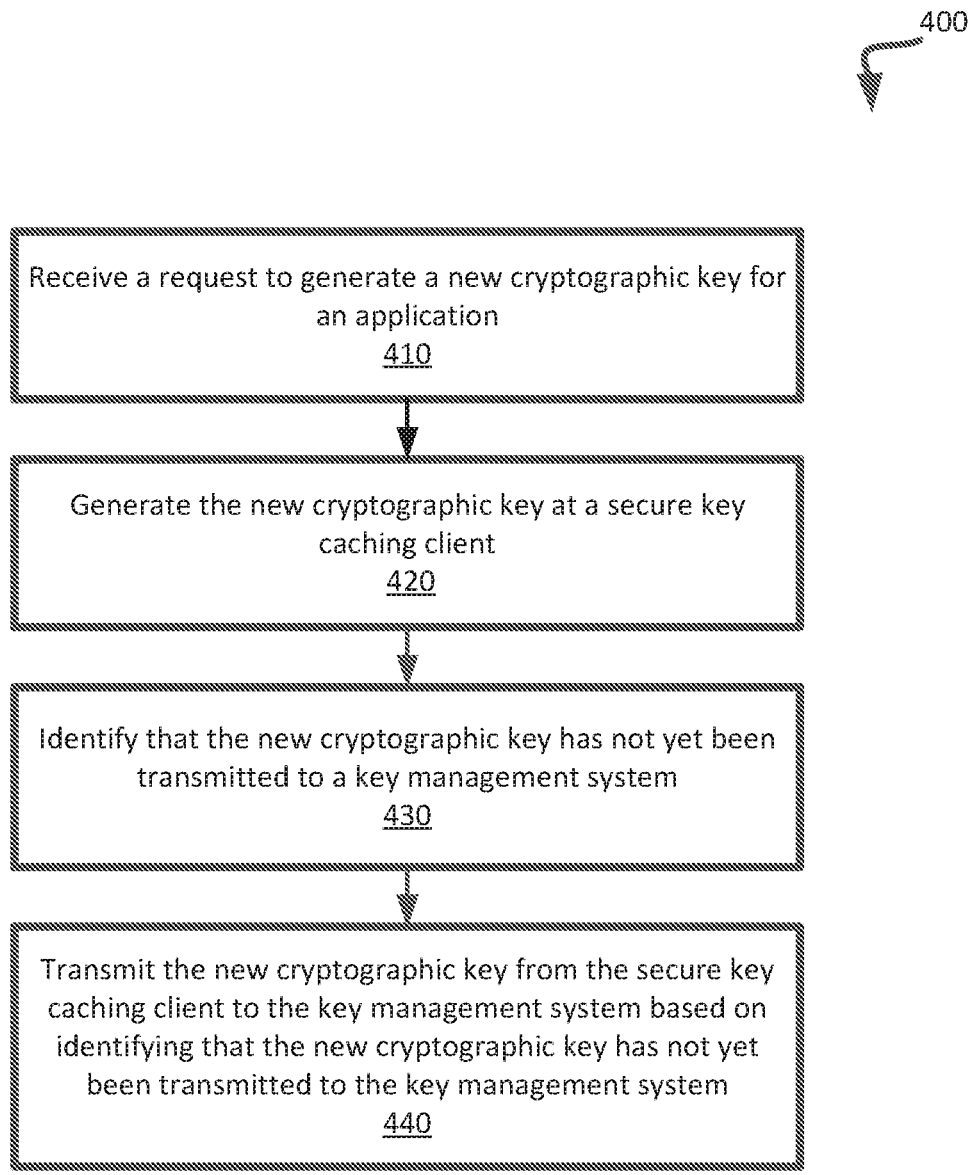
FIG. 4 illustrates a flow diagram of an example method to transmit a cryptographic key from the secure key caching client to a key management system in accordance with some embodiments of the present disclosure.

FIG. 4 illustrates a flow diagram of an example method 400 to transmit a cryptographic key from the secure key caching client to a key management system. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the secure key caching client 110 of FIG. 1.

As shown in FIG. 4, the method 400 may begin with the processing logic receiving a request to generate a new cryptographic key for an application (block 410). For example, the application may provide a request for the secure key caching client to generate a new cryptographic key that is to be used for a subsequent cryptographic operation for the application. The processing logic may subsequently generate the new cryptographic key at a secure key caching client (block 420). For example, the new cryptographic key may be stored at the secure key caching client. Furthermore, the processing logic may identify that the new cryptographic key has not yet been transmitted to a key management system (block 430). For example, the key management system may store copies of any cryptographic key stored at the secure key caching client and may not yet have received the copy of the new cryptographic key. The processing logic may further transmit the new cryptographic key from the secure key caching client to the key management system based on identifying that the new cryptographic key has not yet been transmitted to the key management system (block 440). For example, a connection key at the secure key caching client may be used to establish a secure network connection with the key management system to transmit the new cryptographic key from the secure key caching client to the key management system.

In some embodiments, the secure key caching client may generate log files that identify a use of the cryptographic keys stored at the secure key caching client. For example, the log files may identify a number of times that a particular cryptographic key has been used by a particular application, or any other information identifying information associated with cryptographic keys used during cryptographic operations. In some embodiments, the log files may identify each cryptographic key currently stored at the secure key caching client. Such a log file may be transmitted from the secure key caching client to the key management system.

Figure 5:
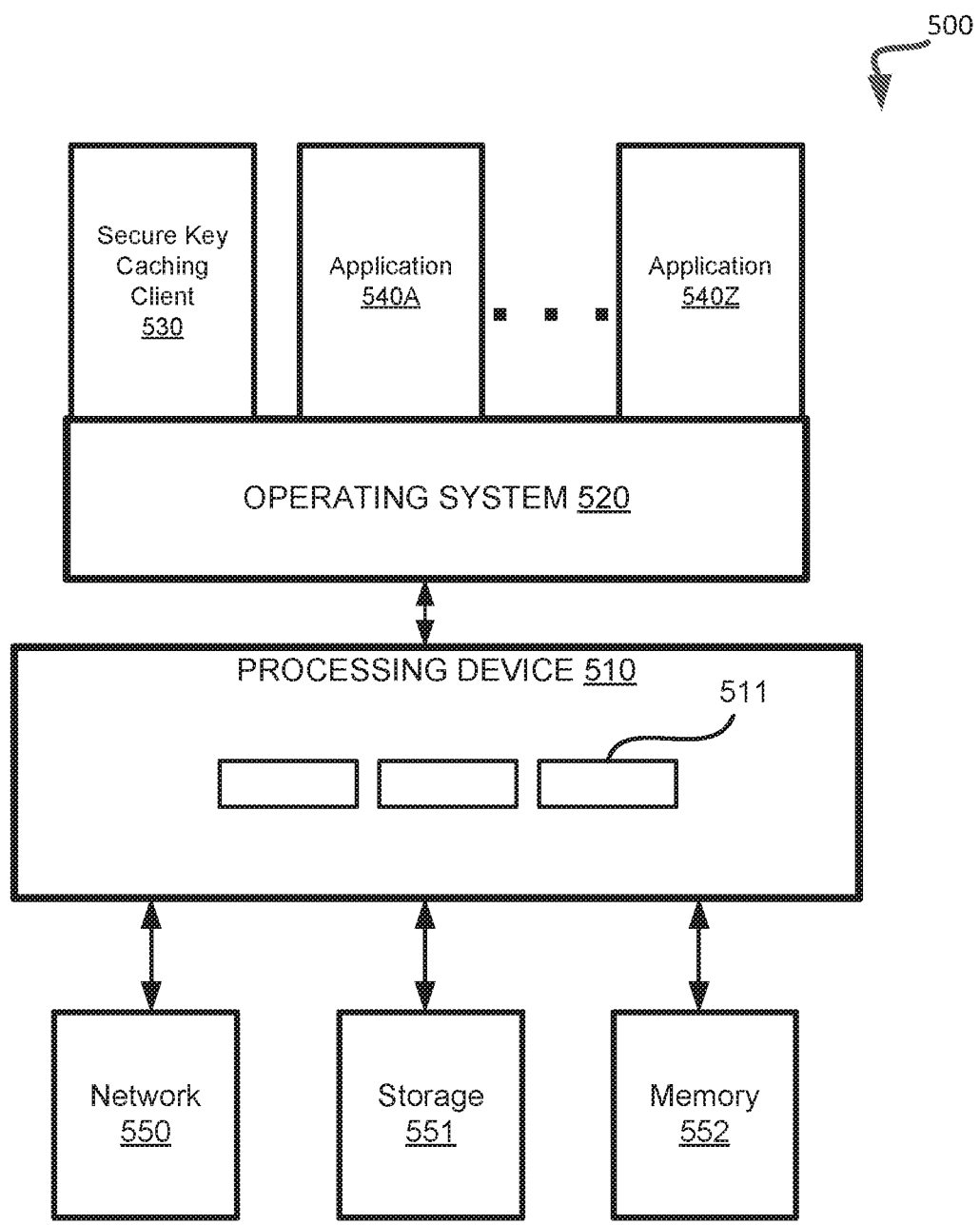
FIG. 5 illustrates an example network server with a secure key caching client to provide secure use of a cryptographic key for one or more applications in accordance with some embodiments of the present disclosure.

FIG. 5 illustrates an example network server 500 with a secure key caching client to provide secure use of a cryptographic key for one or more applications. In general, a secure key caching client 530 may be hosted by a network server to provide secure use of cryptographic keys for one or more other applications 540A to 540Z that are also hosted by the network server or another network server. The secure key caching client 530 may correspond to a secure key caching client 110 of FIG. 1. Furthermore, the secure key caching client 530 of FIG. 5 corresponds to an implementation of the present disclosure that is based on a secure enclave. Other implementations of the present disclosure may be based on kernel cryptosystems, white box cryptosystems, or any other cryptosystem.

As shown in FIG. 5, the network server 500 may include a processing device 510 that may execute an operating system 520. Furthermore, the processing device 510 may include one or more internal cryptographic keys 511 that may be used to encrypt and decrypt data stored in a portion of a memory that is assigned to a secure enclave of the secure key caching client 530. The access to the data of the secure key caching client 530 in the secure enclave (e.g., data stored at a storage resource) may be protected from the one or more applications 540A to 540Z and the operating system 520. For example, the access to the data of the secure enclave corresponding to the secure key caching client 530 may be protected by the use of one of the internal cryptographic keys 511 that are internal to the processing device 510 so that the access to the data is based on a hardware access as opposed to a software access. The operating system 520 may be associated with a first privilege level and the secure key caching client 530 and the applications 540A to 540Z may be associated with a second privilege level where the first privilege level of the operating system is more privileged than the second privilege level of the various applications that are run on the operating system 520 (e.g., the more privileged level allows access to more resources of the network server than the less privileged level). Thus, the operating system 520 may be allowed access to resources of the applications 540A to 540Z. However, since the secure key caching client 530 is assigned to a secure enclave where access to the data of the secure enclave is based on the use of an internal cryptographic key 511 of the processing device 511, the operating system 520 may not be able to access the data of the secure key caching client 530 despite having a more privileged level of access than the secure key caching client 530. The master key that is used to decrypt data at the storage resource may be an internal cryptographic key 511.

In operation, the secure key caching client 530 may be hosted on the network server 200 with the applications 540A to 540Z. The application 240A may perform a function that may use a cryptographic operation with a cryptographic key. In order to securely store the cryptographic key and perform the cryptographic operation securely, the application 540A may establish a connection with the secure key caching client 530. For example, an attestation procedure may be performed by the application 540A to authenticate the secure key caching client 530. After the secure key caching client 530 has been authenticated, a connection may be considered to be established between the application 540A and the secure key caching client 530. The cryptographic key of the application 540A (e.g., used by cryptographic operation) may be provided to the secure key caching client 530. Since the secure key caching client 530 is assigned to a secure enclave, the data of the secure key caching client 530 may be encrypted and protected by the use of an internal cryptographic key 511 (i.e., the master key) of the processing device 510. For example, the secure key caching client 530 may receive the cryptographic key of the application 540A and may transmit an instruction to the processing device 510 to store the received cryptographic key in the memory of its assigned secure enclave. In some embodiments, the secure key caching client 530 may transmit identification information of the secure key caching client 530 to the processing device 510 for the processing device 510 to load the received cryptographic key from the application 540A in the secure enclave of the secure key caching client 530. The processing device 510 may use an instruction to use one of its internal cryptographic keys 511 that is based on the identification of the secure key caching client 530 to store the received cryptographic key in the memory of the secure enclave of the secure key caching client 530. For example, the received cryptographic key may be securely (e.g., encrypted) stored in the storage 551 or memory 552 associated with the processing device 510 or at another storage resource over a network 550 (e.g., at a storage device of the storage resource). In some embodiments, one of the applications 540A to 540Z may provide a request to the secure key caching client 530 to generate a cryptographic key to be used in a cryptographic operation for the respective application 540A to 540Z. For example, the secure key caching client 530 may generate the cryptographic key and may store the cryptographic key in its memory of the secure enclave.

After the cryptographic key of the application 540A has been loaded in the secure enclave, the application 540A may subsequently request for a cryptographic operation to be performed with its cryptographic key. For example, the application 540A may provide a request to the secure key caching client 530 that identifies the cryptographic operation to be performed. The secure key caching client 530 may subsequently use an instruction so that the processing device 510 may use one of its internal cryptographic keys 511 that is based on the identification of the secure key caching client 530 to decrypt the data of the secure enclave of the secure key caching client 530 and to retrieve the cryptographic key. Subsequently, the cryptographic operation may then be performed (e.g., data may be decrypted or data may be signed by using the retrieved cryptographic key) by the processing device 510 and then the output of the cryptographic operation may be provided to the secure key caching client 530 which may return the output to the application 240A. In some embodiments, the internal cryptographic key 511 may be combined with additional information (e.g., the identification information of the secure key caching client 530) to generate the master key for the secure key caching client 530 that is used to decrypt and/or encrypt data associated with the secure enclave of the secure key caching client 530. Thus, since the processing device 510 uses its internal cryptographic key 511 to decrypt data and to perform the cryptographic operation, the cryptographic key received from the application may not be exposed external to the processing device 510.

As such, a network server may run a secure key caching client 530 and an application that may use the secure key caching client 530 for storing or loading keys and managing the use of the keys. Although FIG. 5 illustrates that the secure key caching client 530 may provide secure key management for an application 540A to 540Z on the same network server, the secure key caching client 530 may alternatively be hosted by another network server or may be hosted by another network server that is external to any data center or network cluster that includes the network servers hosting applications 540A to 540Z.

Figure 6:
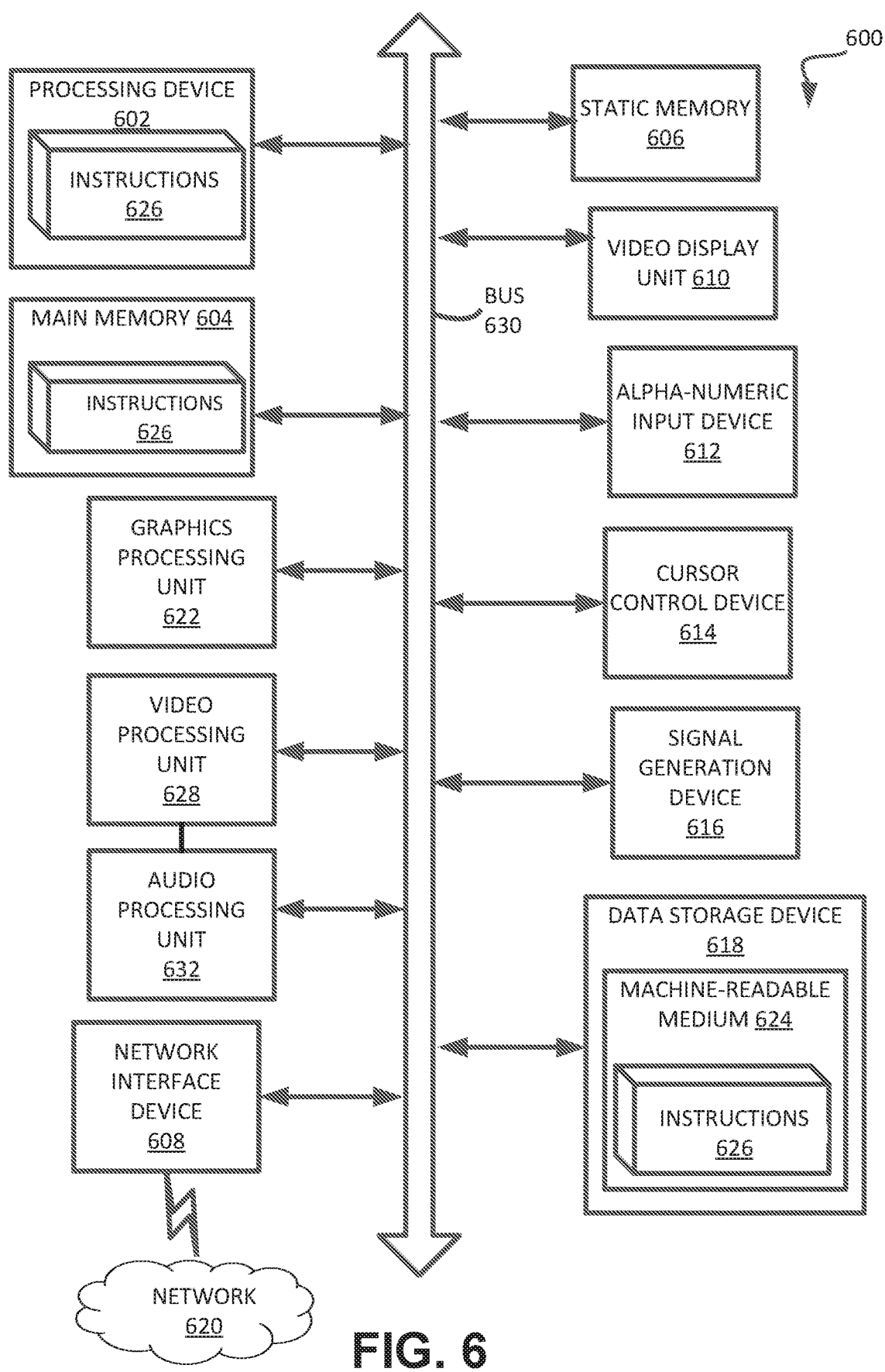
FIG. 6 illustrates an example computer system in which embodiments of the present disclosure operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a secure key caching client. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
  establishing, by a first network server, a first connection between the first network server and a second network server, the first connection being based on a connection cryptographic key stored at a secure location within the first network server, wherein the connection cryptographic key corresponds to a cryptographic key used to securely establish the first connection and wherein the second network server stores and manages application cryptographic keys for use by a plurality of applications;

transmitting, from the first network server to the second network server based on the first connection, a request for one or more application cryptographic keys for one or more applications of the plurality of applications;

receiving, at the first network server from the second network server based on the first connection, the one or more application cryptographic keys; and storing, by a processing device, the one or more application cryptographic keys received from the second network server at the secure location within the first network server that is storing the connection cryptographic key, wherein access to the connection cryptographic key and the one or more cryptographic keys stored at the secure location within the first network server is based on an internal cryptographic key of the processing device, the internal cryptographic key being internal to the processing device.

2. The method of claim 1, further comprising:

receiving a request from an application to perform a cryptographic operation with a particular key of the one or more application cryptographic keys;

performing the cryptographic operation with the particular application cryptographic key stored at the secure location, wherein the particular application cryptographic key is not transmitted from the secure location of the first network server; and providing an output of the cryptographic operation from the secure location of the first network server to the application, the providing of the output being over a second connection between the secure location and the application.

3. The method of claim 1, wherein the secure location corresponds to a secure enclave or a kernel cryptosystem of the first network server.

4. The method of claim 1, further comprising:

receiving, from the application and over the second network connection, a request to generate a new cryptographic key;

generating the new cryptographic key at the secure location of first network server;

establishing a third connection based on another connection cryptographic key, the third connection being between the first network server and the second network server; and transmitting the new cryptographic key over the third connection to the second network server.

5. The method of claim 1, wherein the first connection is a Transport Layer Security (TLS) connection and the connection cryptographic key is a key used to facilitate the TLS connection between the first network server and the second network server.

6. The method of claim 1, wherein the receiving of the one or more application cryptographic keys is based on a characteristic of the application.

7. The method of claim 6, wherein the transmitting of the request for the one or more application cryptographic keys comprises:

determining whether to retrieve a single application cryptographic key or a plurality of application cryptographic keys based on the characteristic of the application, wherein the transmitting of the request is based on the determination.

8. A system comprising:

a memory; and a processing device, operatively coupled with the memory, to:

establish, by a first network server, a first connection between the first network server and a second network server, the first connection being based on a connection cryptographic key stored at a secure location within the first network server, wherein the connection cryptographic key corresponds to a cryptographic key used to securely establish the first connection and wherein the second network server stores and manages application cryptographic keys for use by a plurality of applications;

transmit, from the first network server to the second network server based on the first connection, a request for one or more application cryptographic keys for one or more applications of the plurality of applications;

receive, at the first network server from the second network server based on the first connection, the one or more application cryptographic keys; and store the application one or more cryptographic keys received from the second network server at the secure location within the first network server that is storing the connection cryptographic key, wherein access to the connection cryptographic key and the one or more cryptographic keys stored at the secure location within the first network server is based on an internal cryptographic key of the processing device, the internal cryptographic key being internal to the processing device.

9. The system of claim 8, wherein the processing device is further to:

receive a request from an application to perform a cryptographic operation with a particular key of the one or more application cryptographic keys;

perform the cryptographic operation with the particular key stored at the secure location, wherein the particular key is not transmitted from the secure location of the first network server; and provide an output of the cryptographic operation from the secure location of the first network server to the application, the providing of the output being over a second connection between the secure location and the application.

10. The system of claim 8, wherein the secure location corresponds to a secure enclave or a kernel cryptosystem of the first network server.

11. The system of claim 8, wherein the processing device is further to:

receive, from the application and over the second network connection, a request to generate a new cryptographic key;

generate the new cryptographic key at the secure location of first network server;

establish a third connection based on another connection cryptographic key, the third connection being between the first network server and the second network server; and transmit the new cryptographic key over the third connection to the second network server.

12. The system of claim 8, wherein the first connection is a Transport Layer Security (TLS) connection and the connection cryptographic key is a key used to facilitate the TLS connection between the first network server and the second network server.

13. The system of claim 8, wherein the receiving of the one or more application cryptographic keys is based on a characteristic of the application.

14. The system of claim 13, wherein to transmit the request for the one or more application cryptographic keys, the processing device is further to:
determine whether to retrieve a single cryptographic key or a plurality of cryptographic keys based on the characteristic of the application, wherein the transmitting of the request is based on the determination.

15. A non-transitory computer readable medium comprising data that, when accessed by a processing device, cause the processing device to perform operations comprising:
establishing, by a first network server, a first connection between the first network server and a second network server, the first connection being based on a connection cryptographic key stored at a secure location within the first network server, wherein the connection cryptographic key corresponds to a cryptographic key used to securely establish the first connection and wherein the second network server stores and manages application cryptographic keys for use by a plurality of applications;
transmitting, from the first network server to the second network server based on the first connection, a request for one or more application cryptographic keys for one or more applications of the plurality of applications;
receiving, at the first network server from the second network server based on the first connection, the one or more application cryptographic keys; and
storing the one or more application cryptographic keys received from the second network server at the secure location within the first network server that is storing the connection cryptographic key, wherein access to the connection cryptographic key and the one or more cryptographic keys stored at the secure location within the first network server is based on an internal cryptographic key of the processing device, the internal cryptographic key being internal to the processing device.

16. The non-transitory computer readable medium of claim 15, wherein the operations further comprise:
receiving a request from an application to perform a cryptographic operation with a particular key of the one or more application cryptographic keys;
performing the cryptographic operation with the particular key stored at the secure location, wherein the particular key is not transmitted from the secure location of the first network server; and
providing an output of the cryptographic operation from the secure location of the first network server to the application, the providing of the output being over a second connection between the secure location and the application.

17. The non-transitory computer readable medium of claim 15, wherein the secure location corresponds to a secure enclave or a kernel cryptosystem of the first network server.

18. The non-transitory computer readable medium of claim 15, the operations further comprising:
receiving, from the application and over the second network connection, a request to generate a new cryptographic key;
generating the new cryptographic key at the secure location of first network server;
establishing a third connection based on another connection cryptographic key, the third connection being between the first network server and the second network server; and
transmitting the new cryptographic key over the third connection to the second network server.

19. The non-transitory computer readable medium of claim 15, wherein the first connection is a Transport Layer Security (TLS) connection and the connection cryptographic key is a key used to facilitate the TLS connection between the first network server and the second network server.

20. The non-transitory computer readable medium of claim 15, wherein the receiving of the one or more application cryptographic keys is based on a characteristic of the application, the operations further comprising:
determining whether to retrieve a single application cryptographic key or a plurality of application cryptographic keys based on the characteristic of the application, wherein the transmitting of the request is based on the determination.

\* \* \* \* \*